Dec. 26, 1967     F. FAULHABER     3,360,668
ARMATURE WINDING FOR ROTARY ELECTRICAL MACHINES
Filed Feb. 24, 1965     4 Sheets-Sheet 1

INVENTOR
*Fritz FAULHABER*
by Singer, Stern
& Carlberg
Attorneys

Dec. 26, 1967   F. FAULHABER   3,360,668
ARMATURE WINDING FOR ROTARY ELECTRICAL MACHINES
Filed Feb. 24, 1965   4 Sheets-Sheet 2

INVENTOR
Fritz FAULHABER
by Singer, Stern
& Carlberg
Attorneys

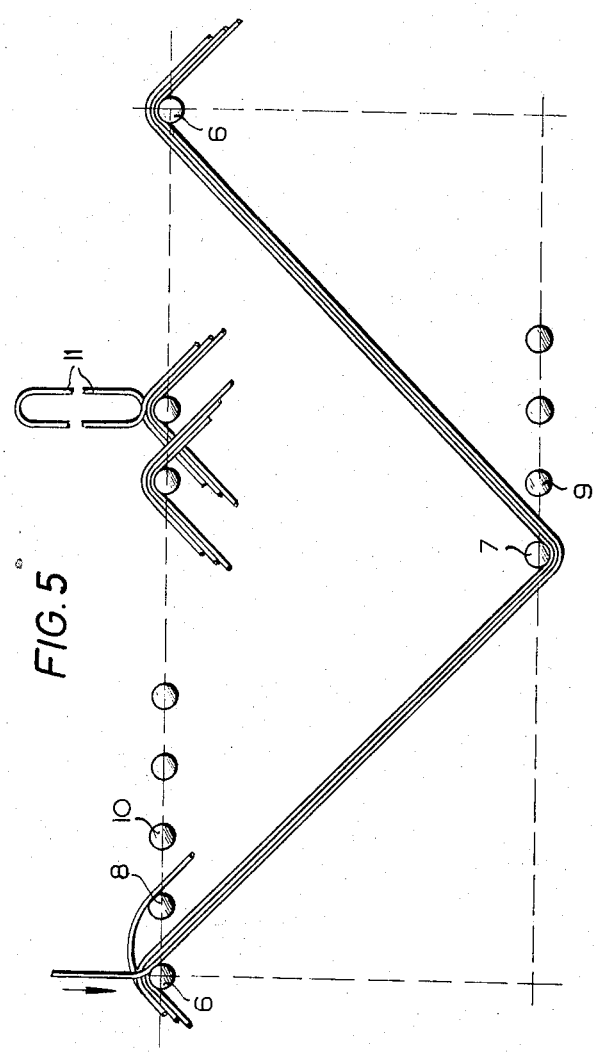

Inventor
Fritz Faulhaber
By Singer, Stern & Carlberg
Attorneys

United States Patent Office 3,360,668
Patented Dec. 26, 1967

3,360,668
ARMATURE WINDING FOR ROTARY ELECTRICAL MACHINES
Fritz Faulhaber, Schonaich, Wurttemberg, Germany, assignor, by mesne assignments, to Retobobina Handelsanstalt, Schaan, Liechtenstein
Filed Feb. 24, 1965, Ser. No. 434,970
Claims priority, application Germany, Feb. 27, 1964, F 42,137
5 Claims. (Cl. 310—195)

The invention relates to armature windings for rotary electrical machines, particularly suitable for bell-shaped rotors used in direct current machines.

Portable appliances, which preferably are operated by batteries, require small sized and medium sized direct current machines.

It is an object of the invention to provide machines of the type mentioned which have a very small weight, a high efficiency and very small dimensions. An electrical machine having an iron-free rotor and a field structure comprising a permanent magnet, particularly a fixedly mounted inner core permanent magnet is particularly well suited for this purpose. The present day iron-free rotors, however, particularly the very small ones, are complicated in their production and therefore expensive and their present form which provides for conductors arranged parallel to the axis of rotation of the rotor has certain disadvantages, such as coil heads which project from the ends of the rotor body and unnecessarily increase the weight of the rotor and the ohmic resistance of the windings. Furthermore, small rotors for higher voltages and for multiple numbers of poles are difficult to manufacture.

It is therefore another object of the invention to provide an armature winding for a rotor which does not have the mentioned disadvantages and is inexpensive in production regardless of its size and number of poles. In accordance with the invention the rotor is provided with a winding which comprises conductors which extend obliquely to the direction of the axis of rotation of the rotor. These obliquely disposed conductors are combined to form individual coils and all these coils are formed by a single continuous wire which is continuously wound upon a coil form.

Figure 1:
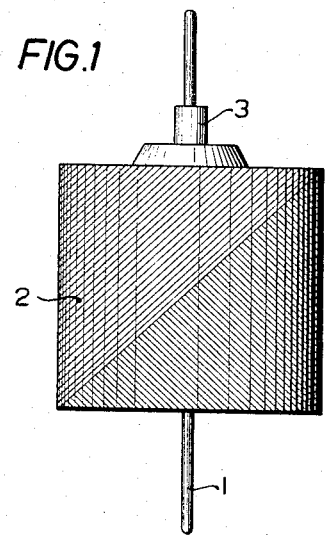
Figure 2:
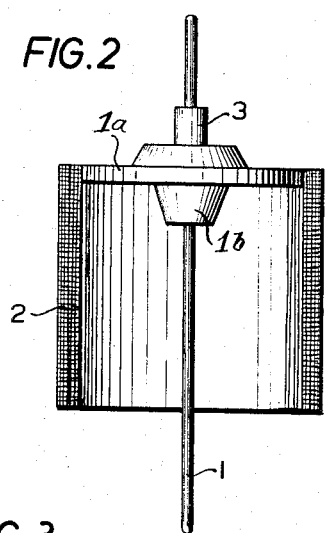
Figure 3:
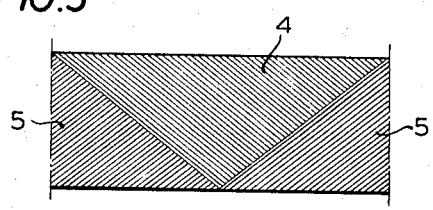
Figure 4:
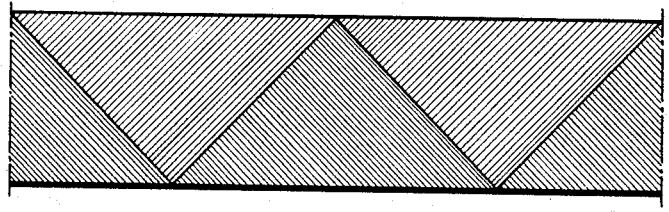
Figure 4A:
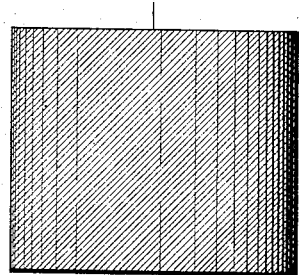
Figure 6:
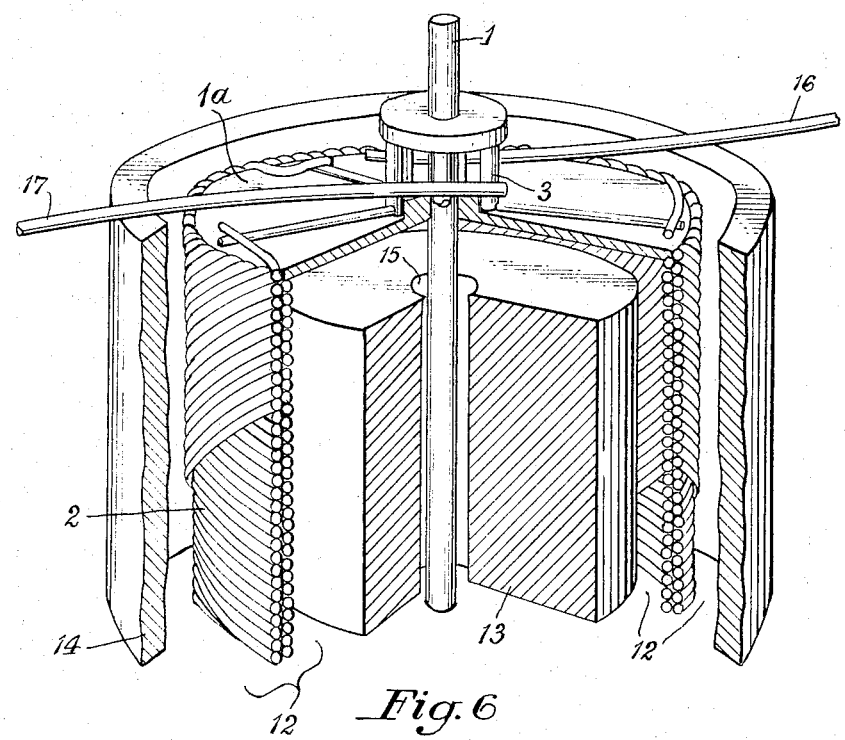
Figure 7:
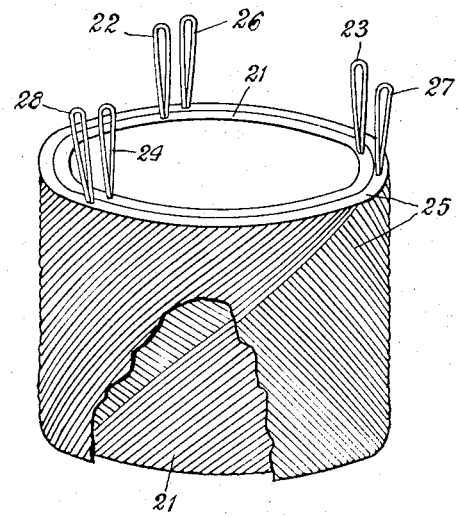

The above objects and others are explained in greater details in the following specification with reference to the accompanying drawings in which:

FIGURE 1 is an elevation view of a rotor provided with the armature winding of the invention, FIGURE 2 is an axial sectional view of the rotor shown in FIGURE 1, FIGURE 3 illustrates a developed projection of an armature winding according to the invention designed for two poles, FIGURE 4 illustrates a developed projection of an armature winding according to the invention designed for four poles, FIGURE 4a illustrates an armature winding of the prior art, FIGURE 5 illustrates diagrammatically the winding of the armature winding of the invention by means of a coil former provided with holding devices, FIGURE 6 is a perspective view with parts broken away of the armature when assembled in a housing provided with a stationary inner core permanent core magnet around which the armature is freely rotatable, and FIGURE 7 is a perspective view of an armature provided with two separate concentrically arranged windings forming a single mechanical unit.

Referring to the FIGURES 1 and 2, the illustrated rotor for an electrical machine comprises a rotor shaft 1 having attached thereto a circular disc 1a with a conical hub 1b and an armature winding 2 having the shape of a cylindrical sleeve, one end of which is fixedly attached to the outer circumference of the circular disc 1a. In this manner is formed a bell-shaped rotor. Adjacent the outer face of the disc 1a the rotor shaft 1 carries a commutator 3 whose segments are conductively connected with the coils forming the armature winding 2. This rotor may be used in connection with a fixedly arranged permanent core magnet and a housing therefor as is described in the copending application of Faulhaber and Hefter, Ser. No. 380,868, filed July 7, 1964. FIGURE 3 illustrates a developed projection of the armature winding and the novel arrangement of the two layer coil winding which is provided with oblique conductors. These conductors in accordance with the invention extend in the area 4 in one direction and in the two areas 5 in the opposite direction.

In accordance with the invention this new type of winding produces on the outer and inner circumferential surface of the sleeve-like armature winding a number of conductor areas having the form of isosceles triangles, the number of which is equal to the number of poles of the winding of the electrical machine. The bases of these triangles are formed by the ends of the coils and on the two sides takes place the transfer of all conductors from one layer into the other layer. The number of the transfer points is equal to the number of poles.

If the armature winding is produced as a multipolar winding then it has the appearance as shown in FIGURE 4. The novel appearance of the winding is the result of the winding pattern which will be produced when according to the invention a single continuous wire is wound upon a coil form. The two sides of the first coil will come to lie upon the form, but the two sides of the last coil will lie upon all of the other coils, namely on the outside. Upon comparing this novel winding pattern with conventional patterns, for instance, with the German Patent No. 45,808 or the Swiss Patent No. 278,380, one will find that the oblique windings heretofore employed have another structure. One side of the coils lies in one layer, for instance, in the lower layer, and the other side of the coils lies in the other layer, namely in the upper one. Such conventional windings, however, can not be produced by employing a single continuous wire and winding it upon a form. These conventional windings are exteriorly recognized by the fact that they always look alike when viewed from different directions and depending upon how the winding has been started, they show a picture similar to a right-hand thread or a left-hand thread as shown in FIGURE 4a. The winding of the invention, however, has a different appearance when viewed from different directions.

The production of the armature winding takes place on a cylindrical coil form which is provided with holding devices, such as pins, at the ends of the armature for forming reversing points for the wire from which the winding is produced. The number of holding devices is equal to the number of coils which included at least three turns to the coil to form the completed armature winding. The wire is guided in a zig-zag path along the circumference of the coil form, back and forth forming a series of runs which alternately extend from one end of the coil form to the other and the winding pitch is exactly 180° along the circumference. This is an important difference over a similarly constructed distributed winding which has a winding pitch of 180° ± of the thickness of the wire. Such a "distributed" winding consists of two layers which together have a thickness equal to the thickness of two conductors, whereby in each layer the conductors are disposed one next to each other.

The mentioned degrees are electrical degrees and refer to the pole division, which is equal to 180 electrical degrees and also in space is 180° in a two pole machine. In a four pole machine 180 electrical degrees would correspond to 90° in space, etc.

On a holding device, which is arranged at the ends of the armature, and which holds the turning points of the individual coils, is wound the number of turns which each individual coil is to have, whereby the winding pitch is exactly 180°. Thereupon the wire is guided to the two parts of the next holding device and another coil with the same number of turns is wound on the mentioned two parts. FIGURE 5 illustrates this winding procedure for an armature winding having two poles. The wire which enters the coil form where the arrow is shown is first guided around a pin 6 and then obliquely is guided toward the other end of the coil where the pin 7 is arranged. From the pin 7 the wire returns obliquely to the pin 6. This winding procedure continues until the coil has the desired number of turns, for instance three turns as shown in FIGURE 5. Thereafter the wire is guided to the pin 8 and then to the pin 9 and is wound about these pins 8 and 9 until another coil of three turns has been formed. Then the wire is guided to pin 10 and again a coil of three turns is formed on the pin 10 and the pin following pin 9 at the other end of the armature. This winding procedure is continued until all of the holding devices, namely all the pins in the present case, are provided with coils, each having three turns. The coil form has then the appearance as shown in FIGURE 3. The taps on the armature windings for connecting the same with the commutator 3 are formed by outwardly extending loops 11 (FIGURE 5) which are a part of the wire from which the armature winding is produced.

In place of transferring the wire from one coil to the other on one side of the armature, namely from pin 6 to the pin 8, it would also be possible to guide the wire, after completion of the coil, from the pin 6 to the pin 9 and then back to pin 8 for forming the next coil. There are indeed additional transfer methods between the coils available, for instance, one may not only wind the next coil on the next pair of pins but one may choose to use the second next pair of pins or any desired other pair of pins.

The advantages of the armature winding of the invention are as follows:

The rotor may be produced relatively quickly, and at any rate faster as when the heretofore employed methods are used. The armature winding of the present invention does not have any winding heads which extend outwardly from the ends of the armature and cause ohmic voltage losses without contributing to the development of torque. The armature winding is supported at only one end by the disc 1a and since the windings are held together by an adhesive does not require any sleeve-like support as is necessary in some bell-shaped armatures of the prior art. The start of the rotor of this invention is extremely quick in view of the favorable arrangement of the magnetic field and the oblique conductors on the rotor. The mechanical rigidity of the armature winding is extremely good in view of the fact that the produced forces are directed by crossing conductors directly to the segments of the commutator. The two layer armature winding of the invention which does not require any support other than the adhesive binder is exceptionally well adapted to dissipate heat which is produced in the coils, so that relatively high current densities can be employed.

The disclosed two embodiments, namely a two pole winding and a multiple pole winding for bell-shaped armatures, wherein each armature winding comprises a single continuous wire, are not restricted to any specific mechanical limits, while conventional bell-shaped armatures are restricted to specific dimensions in order to keep the winding heads within limits else the efficiency of the machine suffers. The present invention permits the construction of the smallest armatures with high degrees of efficiency. The armature winding of the invention is not limited to the exclusive use in direct current machines but upon modification of the coil connections may also be used in alternating current machines. It should be noted that after the completion of the winding of the armature on the coil form, the armature winding is made rigid by an adhesive. Thereupon, the removable pins 6, 7, 8, 9 etc. are removed from the coil form and the armature having the shape of a thin-walled sleeve is removed from the coil form.

FIGURE 6 illustrates the armature winding 2 when attached to the circular disc 1a and the rotor shaft 1 with the coil ends connected to the commutator 3. The annular air gap 12 between the outer wall of the inner cylindrical permanent magnet 13 and the cylindrical inner wall of the housing 14 is shown in a greatly enlarged size to clearly show the sleeve-like armature winding 2.

I claim:

1. An armature winding for an iron-free bell-shaped rotor of an electrical machine, said winding having the form of a hollow right-circular cylinder and wound from a single length of wire, said wire extending progressively around said cylinder along a path which comprises a series of runs which alternately extend from one end of said cylinder to the other and back again, said runs each having the form of a helix having alternate right and left-hand pitches and extending equal even integral fractions of a convolution around said cylinder, said wire being wound a number of times over each of said runs so that coils are formed which are disposed adjacent one another and uniformly over the surface cylinder, so that they form successive complementary areas in the shape of isosceles triangles in each of which areas said coils are parallel.

2. An armature winding according to claim 1, in which said fraction of a convolution is one half of a convolution, there being thus formed on the outer surface of said winding two of said areas.

3. An armature winding according to claim 1, in which said fraction of a convolution is one quarter of a convolution, there being thus formed on the outer surface of the winding four of said areas.

4. An armature winding according to claim 1, wherein tappings to said winding are made by looping out a turn of said wire at points circumferentially spaced along one end of said cylindrical armature winding.

5. An armature winding comprising two windings according to claim 1, namely an inner one and an outer one, arranged concentrically about the inner winding and composed of a single length of wire.

References Cited

UNITED STATES PATENTS

| 2,849,630 | 8/1958 | Waloff et al. | 310—266 |
| 3,209,187 | 9/1965 | Angele | 310—266 |

FOREIGN PATENTS

| 123,423 | 1/1947 | Australia. |

MILTON O. HIRSHFIELD, *Primary Examiner.*

L. L. SMITH, *Assistant Examiner.*

UNITED STATES PATENT OFFICE
CERTIFICATE OF CORRECTION

Patent No. 3,360,668                      December 26, 1967

Fritz Faulhaber

It is hereby certified that error appears in the above numbered patent requiring correction and that the said Letters Patent should read as corrected below.

Column 4, line 24, before "I claim:" insert the following and particularly the appearance of the pitch of the coils which form the armature winding. The lower end of the permanent magnet 13, in a manner not shown, is fixedly connected by a suitable magnetical housing portion with the cylindrical housing 14. The rotor shaft 1 extends freely rotatable through an axial bore 15 provided in the inner core magnet 13 and with its ends is rotatably supported in any desired bearings. The commutator 3 is engaged by any suitable flexible conductors 16, 17 supplying electric current to or receiving electric current from the armature winding 2.

The invention also contemplates the modification comprising a continuous winding after one armature winding has been completed, so that additional armature windings are produced, which mechanically form a unit but electrically form two or more separate circuits.

Such an armature winding is illustrated in Fig. 7 in which the inner winding 21 is provided with commutator connecting loops or taps 22, 23 and 24, while the outer winding 25 is provided with the commutator connecting loops or taps 26, 27 and 28. This armature winding has armature coils with two or more separate circuits which mechanically form a single unit.

Another modification comprises a bifilar construction of the armature winding in which in place of a single continuous wire each coil is wound by simultaneously winding it with two continuous parallel wires.

Signed and sealed this 8th day of April 1969.

(SEAL)
Attest:

EDWARD M. FLETCHER, JR.                EDWARD J. BRENNER
Attesting Officer                       Commissioner of Patents